(12) United States Patent
Masser et al.

(10) Patent No.: US 7,886,583 B2
(45) Date of Patent: Feb. 15, 2011

(54) APPARATUS AND METHOD OF AMPLIFYING LOW VOLTAGE SIGNALS

(75) Inventors: Carl Masser, Santa Barbara, CA (US); Henry Mittel, Santa Barbara, CA (US)

(73) Assignee: Veeco Instruments Inc., Woodbury, NY (US)

(*) Notice: Subject to any disclaimer, the term of this patent is extended or adjusted under 35 U.S.C. 154(b) by 477 days.

(21) Appl. No.: 11/456,787

(22) Filed: Jul. 11, 2006

(65) Prior Publication Data

US 2008/0011064 A1 Jan. 17, 2008

(51) Int. Cl.
*G01B 5/28* (2006.01)
(52) U.S. Cl. ...................................................... 73/105
(58) Field of Classification Search .................. None
See application file for complete search history.

(56) References Cited

U.S. PATENT DOCUMENTS

| | | | |
|---|---|---|---|
| 3,956,927 A | 5/1976 | Pearson | |
| 4,155,263 A | 5/1979 | Frantz | |
| 4,213,348 A | 7/1980 | Reinertson et al. | |
| 4,233,848 A | 11/1980 | Sato et al. | |
| 4,868,411 A | 9/1989 | Ishihara | |
| 5,048,343 A | 9/1991 | Oboodi et al. | |
| 5,959,798 A * | 9/1999 | Sasaki et al. | 360/67 |
| 5,988,000 A | 11/1999 | Adams | |
| 6,053,050 A | 4/2000 | Zahzah et al. | |
| 6,291,822 B1 * | 9/2001 | Umemoto et al. | 250/306 |
| 6,452,161 B1 * | 9/2002 | Yedur et al. | 250/234 |
| 7,513,142 B2 * | 4/2009 | Rice et al. | 73/105 |

* cited by examiner

*Primary Examiner*—Robert R Raevis
(74) *Attorney, Agent, or Firm*—Boyle Fredrickson, S.C.

(57) ABSTRACT

A low voltage signal amplifying apparatus includes a probe device, an actuator providing relative motion between the probe device and the sample, and a transducer that generates a voltage signal indicative of a property of at least one of the probe device, the sample, and the actuator. A differential voltage to current converter receives a differential voltage signal from the transducer and generates a differential current signal to provide a balanced, differential, low impedance current mode amplified signal that can be readily carried over a signal transmission device.

31 Claims, 11 Drawing Sheets

APPARATUS AND METHOD OF AMPLIFYING LOW VOLTAGE SIGNALS

BACKGROUND OF THE INVENTION

1. Field of the Invention

The preferred embodiments are directed to amplification of low magnitude electrical signals generated by low impedance sources, and more particularly, amplification of low voltage signals generated by position sensors such as those used to measure movement of an actuator of a scanning probe microscope (SPM).

2. Discussion of the Prior Art

A scanning probe microscope, such as an atomic force microscope (AFM) operates by providing relative scanning movement between a measuring probe and a sample while measuring one or more properties of the sample. A typical AFM system is shown schematically in FIG. 1. An AFM 10 employing a probe device 12 including a probe 14 having a cantilever 15 is coupled to an oscillating actuator or drive 16 that is used to drive probe 14, in this case, at or near the probe's resonant frequency. Commonly, an electronic signal is applied from an AC signal source 18 under control of an AFM controller 20 to cause actuator 16 to drive the probe 14 to oscillate, preferably at a free oscillation amplitude $A_o$. Probe 14 is typically actuated toward and away from sample 22 using a suitable actuator or scanner 24 controlled via feedback by controller 20. Notably, the actuator 16 may be coupled to the scanner 24 and probe 14 but may be formed integrally with the cantilever 15 of probe 14 as part of a self-actuated cantilever/probe. Moreover, though the actuator 24 is shown coupled to the probe 14, the actuator 24 may be employed to move sample 22 in three orthogonal directions as an XYZ actuator, i.e., both Z motion, and X-Y scanning motion such as a raster scanning.

For use and operation, one or more probes may be loaded into the AFM and the AFM may be equipped to select one of several loaded probes. Typically, the selected probe 14 is oscillated and brought into contact with sample 22 as sample characteristics are monitored by detecting changes in one or more characteristics of the oscillation of probe 14, as described above. In this regard, a deflection detection apparatus 17 is typically employed to direct a beam towards the backside of probe 14, the beam then being reflected towards a detector 26, such as a four quadrant photodetector. As the beam translates across detector 26, appropriate signals are transmitted to controller 20, which processes the signals to determine changes in the oscillation of probe 14. Commonly, controller 20 generates control signals to maintain a constant force between the tip and sample, typically to maintain a setpoint characteristic of the oscillation of probe 14. For example, controller 20 is often used to maintain the oscillation amplitude at a setpoint value, $A_S$, to insure a generally constant force between the tip and sample. Alternatively, a setpoint phase or frequency may be used.

Commonly, actuator 24 is a piezoelectric tube (often referred to herein as a "piezo tube") or flexure that is used to generate relative motion between the measuring probe and the sample surface. A piezoelectric tube is a device that moves in one or more directions when voltages are applied to electrodes disposed inside and outside the tube. Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

Piezoelectric tubes and other types of actuators are imperfect. For example, a piezo tube often does not move only in the intended direction. When a Z actuator, for instance, is commanded to move in the Z-direction (by the application of an appropriate voltage between the actuator's electrodes), the Z actuator moves not only in the Z direction, but in the X and/or Y directions as well. This unwanted parasitic motion limits the accuracy of measurements obtained by scanning probe microscopes. The amount of this parasitic motion varies with the geometry of the tube and with the uniformity of the tube material but typically cannot be eliminated to achieve the accuracy required by present instruments.

More particularly, with respect to movement in the intended direction, the ideal behavior would be that the actuator move in exact proportion to the voltage applied. Instead actuators, including piezo tubes, move in a non-linear manner, meaning that their sensitivity (e.g., nanometers of motion per applied voltage) can vary as the voltage increases. In addition, hysteresis and creep often compromise the intended motion. Most generally, the response to an incremental voltage change will depend on the history of previous voltages applied to the actuator. These effects, thus, can cause a large prior motion to affect the response of a commanded move, even many minutes later.

Similarly, vertical measurements in scanning probe microscopy are typically calculated mathematically by recording the voltage applied to the Z actuator and then multiplying by the actuator's calibrated sensitivity in nm/V. However, as mentioned previously, this sensitivity is not constant and depends on the previous voltages applied to the tube. Using the voltage applied to the tube to calculate the vertical motion of the tube therefore will always result in an error with respect to the actual motion. This error can translate directly into errors when measuring and imaging surface topography of a sample and performing other metrology experiments. These issues have been addressed specifically for the case in which the probe assembly and device of the AFM is coupled to the actuator (i.e., the case in which the probe assembly moves in three orthogonal directions, for example, in the cases cross-referenced below), as well as when the actuator is coupled to the sample.

Methods of monitoring the motion of the probe or sample when driven by a SPM actuator have been implemented in an attempt to compensate for this parasitic X and Y error, with mixed results. The devices are typically calibrated by applying a voltage to the X-Y tube and the Z tube, and then measuring the actual distance that the sample or probe travels. Thus, the position of the actuator is estimated by the voltage that is applied to the X-Y tube and the Z tube. However, correcting for the (X,Y) position error introduced by the Z actuator on the probe or sample is difficult because it requires additional calibration steps and more complex circuitry to determine the correct voltage to apply to, the Z tube or to the X-Y tube.

Some SPMs attempt to improve accuracy by using an auxiliary displacement sensor to actively monitor actuator movement and adjusting the voltage to the appropriate SPM actuator(s) to cause the actuator to move to the desired manner. Several auxiliary displacement sensors, sometimes referred to as position sensors, have been proposed for monitoring actuator movement, including Linear Variable Displacement Transducers (LVDTs), capacitance sensors, strain gauge sensors, and optical displacement sensors (ODSs).

Such SPM actuator position signals generated by one of these types of displacement sensors are low voltage signals that must be amplified before they can be utilized by the operator or otherwise further processed (e.g., data acquisition and control). One challenge in this regard is that these weak voltage signals are susceptible to the adverse effects of electrical interference, such as "pick-up" and other miscellaneous noise, especially as they are transmitted over lengths of wire or cable. As a result, given their robust nature, sensors that produce differential outputs are often employed along with differential amplifiers. Differential amplifiers amplify the difference between two input signals, and operate to restore the original signals as long as the common mode signals are not too large. In one implementation, a detection system 30 includes strain gauge resistors or sensors 34 disposed on an SPM actuator (not shown) in a conventional fashion to monitor position and translation of the actuator. Typically, a differential output is provided by configuring the resistors 34 in a Wheatstone bridge 32, as shown in FIG. 1. In this case, an instrumentation amplifier 36 is often employed to amplify the low voltage differential signals generated by the bridge 32.

An instrumentation amplifier is an arrangement of operational amplifiers that provides programmable high gain, low offset, reasonably low noise, particularly at high gain settings, and high rejection of common mode signals, i.e., high rejection of identical signal components on both the "+" and "−" inputs of the instrumentation amplifier (high common mode rejection ratio (CMRR)), for example, due to a difference in ground between the signal source and the receiver.

Although widely used, including in the SPM environment, instrumentation amplifiers (IAs) are not ideal for many applications because IAs have relatively high power dissipation. More particularly, the amplifier is preferably placed in close proximity to the source of the low voltage signals, i.e., the position sensor (e.g., a Wheatstone bridge connected strain sensor) in this case, which oftentimes requires placing the amplifier in the AFM head. Though this typically operates to maintain a high CMRR and good immunity from electrical interference, the arrangement is often problematic because the aforementioned associated high power dissipation. The instrumentation amplifier is powered by the voltage source ±V, which typically is about 15 volts (thus, 30 volts), resulting in a typical power dissipation of 300 mW for instrumentation amplifiers optimized for low input voltage noise. Because the AFM head houses a majority of the AFM's thermally sensitive precision components, crippling thermal drift effects can be introduced into the system when including an instrumentation amplifier in or near the head. Because resolution of these instruments is on the nanoscale and below, thermal drift is a problem that can severely compromise the usability of the data obtained by an AFM.

Notably, another drawback with instrumentation amplifiers is that, if the required amplification is modest, the amplifier tends to have relatively high noise and degraded common mode rejection. The gain required to achieve the level of signal desired in AFM applications employing strain gauges and other types of sensors is dependent on, for example, the amount of strain experienced by the gauges and their sensitivity (gauge factor, i.e., the amount the resistance changes for a given strain). In this case, the required gain is relatively low given the performance of the strain gauges used which are preferably semiconductor-type strain gauges that have a limited range of detectable strain for which they are linear. To get the lowest possible noise and the best dynamic range (i.e., biggest signal at small actuator extensions), the system should be set up so that the "rail" of the amplifier is just reached at the maximum extension of the scanner. Typically, the gain required to amplify the maximum strain that produces linear operation of the semiconductor strain gauge is about 50, yielding an output of about +/−10 volts. As a result, with relatively modest gain requirements, noise and common mode rejection when using an instrumentation amplifier is not ideal.

Further with respect to the Wheatstone bridge, and similar in this regard, for the nominal condition, it is important that the bridge be balanced, i.e., produce zero differential voltage when the actuator is at its midpoint position. Otherwise, the amplifier operates to amplify some offset, thus minimizing its range of detectable outputs. When using an instrumentation amplifier, the offset may be so large that the applied gain saturates the amplifier, thus corrupting the resultant output signals. Since the elements of the Wheatstone bridge are in general not precisely equal in nominal resistance due to manufacturing variations, a balancing circuit is often provided. Three examples of such circuits are provided in FIGS. 3A-3C. In each circuit, 40, 42 and 44, respectively, a variable resistor, VR1, can be manipulated to balance the bridge in an effort to ultimately avoid amplifier saturation. However, each of these systems requires some sort of control knob located near the strain gauge which most often is quite inconvenient (real estate on an AFM is at a premium) or requires, for example, a type of digitally controlled potentiometer which can create problems given the extra signal needed to control it (i.e., typically requires an extra wire to the head which can cause troublesome electrical interference or coupling of mechanical vibrations). Moreover, each of these circuits 40, 42, 44 tend to cause drift, thus placing the designs at high risk to compromise instrument precision. For these reasons, an alternate scheme to compensate for bridge imbalance was desired.

As a result, and still further in this regard, for many applications in SPM, it is preferable to transmit the acquired signals (data, position, etc., for example) to a remote location to, for example, minimize heat dissipation in the head of the AFM. However, signals carried over cables to a remote amplifying stage are particularly susceptible to electromagnetic interference, as suggested previously. As a result, it was desired to have a balanced, differential, low impedance current mode amplified signal given that such signals can be readily carried over cables to a second amplifier or data acquisition system in a way that is relatively immune to electromagnetic interference. In this case, it would also be highly desirable to have a way to remotely compensate for imbalance of the low impedance source (e.g., a Wheatstone bridge accommodating an arrangement of strain gauge sensors) without requiring physical access to the first stage amplifier. As a result, additional wires and power dissipating elements would be minimized in the first stage of the amplifier.

SUMMARY OF THE INVENTION

The signal amplifying apparatus and methods of the preferred embodiments provide a balanced, differential, low impedance current mode amplified signal that can be readily carried over signal transmission devices such as cables. The preferred embodiments are thus particularly useful in AFM applications given that power dissipation in the head is minimized, yet the amplifier is able to transmit signals that are relatively immune to electrical interference. In general, the preferred embodiments amplify voltage signals from a low impedance source such as strain gauges arranged in a Wheatstone bridge by providing a balanced, differential, low impedance amplified signal with high linearity, high rejection of input common mode signals and low power dissipation, all in a cost effective fashion. Moreover, the preferred embodiments optionally provide a way to remotely compensate for imbalance of the Wheatstone bridge without adding complexity, noise or power dissipation to the amplifier, and without requiring additional signals to travel from the Wheatstone bridge to separate control, data acquisition, etc., systems. Note that the term "low impedance source" as referenced herein is preferably a source having an impedance that is less than about one MOhm. Moreover, reference to such sources generating low voltage signals includes signals in a range of about 1 nV to 1 mV.

According to a first aspect of the preferred embodiments, a probe microscope that analyzes a sample includes a probe device, an actuator, and a transducer that generates a voltage signal indicative of a property of at least one of the probe device, the sample, and the actuator. The microscope also includes a differential voltage to current converter that receives a differential voltage signal from the transducer and generates a differential current signal.

In a further aspect of this embodiment, the microscope includes a signal conditioning block and a transmission device that transmits the differential current signal to the signal conditioning block.

In yet another aspect of this embodiment, the signal conditioning block includes a current to voltage (I-V) converter to convert the differential current signal to an output differential voltage signal.

According to a further aspect of this embodiment, the voltage to current converter includes an input emitter coupled pair of balanced transistors that amplify the voltage signal.

In another aspect of this embodiment, the signal conditioning circuit includes a cascode circuit to maintain a substantially constant voltage across collector terminals of the input BJT transistors.

According to a still further aspect of this embodiment, the transducer is a position sensor and the position sensor is one of a group including a strain gauge, an lvdt sensor, an RTD sensor, a piezoelectric transducer, a photodiode, a photo resistor, a four-point probe, and a spreading resistance sensor.

In a further aspect of this embodiment, the position sensor includes at least one strain gauge sensor arranged in a Wheatstone bridge.

According to another aspect of this embodiment, the signal conditioning block includes a remote balance circuit to compensate for imbalance of the Wheatstone bridge.

According to another preferred embodiment, a probe microscope for analyzing a sample includes a probe device, an actuator that provides relative motion between the probe device and the sample, and a strain sensor coupled to the actuator. In this case, the strain sensor includes at least one (and preferably all four) strain gauge resistor arranged in a Wheatstone bridge configuration that generates a differential voltage signal. Moreover, the microscope includes an amplifier that amplifies the differential voltage signal to a current mode signal. The power dissipation of the amplifier is ideally less than about 3 mW.

According to yet another embodiment, a method of amplifying low voltage signals generated by a position sensor coupled to an actuator of a scanning probe microscope includes sensing movement of the actuator and generating a corresponding differential voltage signal, and converting the differential voltage signal to an output current signal in an input stage. The method also includes transmitting the output current signal from the input stage to an output stage, and converting the output current signal in the output stage to an output differential voltage signal.

In a further aspect of this embodiment, a supply voltage required to perform the method is less than about 10 volts, and more preferably, less than about 2.5 volts.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

The preferred embodiments operate to amplify low voltage signals originated from a low impedance voltage source, for example, a position sensor including at least one strain gauge resistor arranged in at least a portion of a Wheatstone bridge, to a level suitable for further processing by the instrument, such as a scanning probe microscope. Although amplification of the low voltage signals is performed locally in the preferred embodiments, power dissipation is minimized while maintaining a low input referred noise level (about 2.5 mW for an input referred noise of less than about 3 nV/root Hz), with signal conditioning electronics being located remotely from the voltage source to further minimize power dissipation in the vicinity of the voltage source (e.g., strain gauge sensor), in this case, the head of an atomic force microscope. As a result, the adverse affects of thermal drift are minimized, thus preserving the integrity of the data. Note that, although described herein in connection with a strain sensor including one or more strain gauge resistors arranged in a Wheatstone bridge it should be understood that any low impedance voltage source producing low voltage signals is contemplated by the preferred embodiments. For example, a transducer including any device capable of converting a property to a voltage, for example, an LVDT, an RTD sensor (resistance temperature detector, e.g., platinum), a piezoresistive transducer such as a piezoresistor, a properly designed photodiode, a photo resistor, e.g., built into a cantilever of the probe device, a four-point probe, or a spreading resistance sensor, could be employed.

Figure 4A:
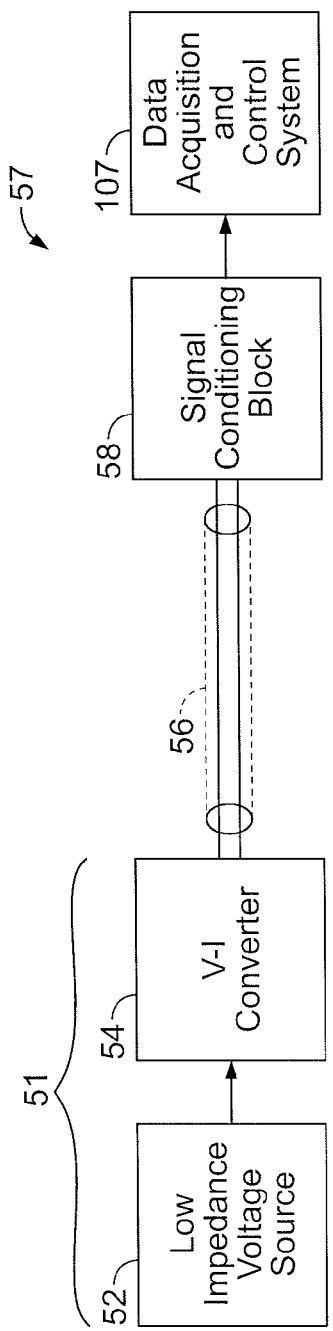
FIG. 4A is block diagram illustrating an apparatus for amplifying low voltage signals according to the present invention.

Referring initially to FIG. 4A, a block diagram 50 illustrates the primary components of the preferred embodiments and suggests their corresponding methods. In particular, apparatus 50 includes an input stage 51 including a low impedance voltage source 52 that generates low voltage signals requiring amplification prior to further processing by the instrument. Again, though strain gauge resistors arranged in a Wheatstone bridge are described in the preferred embodiment, other types of sources are contemplated. For example, other types of sensor systems, such as LVDT sensors, a strain sensor including a portion of a Wheatstone bridge, etc., are suitable for taking advantage of the benefits of the present preferred embodiments, especially given that they are often used in applications in which they output low voltage signals, as is the case when used in an AFM environment to measure motion provided by one or more piezoelectric actuators.

Low impedance source 52 outputs a low voltage signal and communicates the signal to an amplifier 54, preferably a voltage-to-current (V-I) converter that converts the voltage signal to an amplified current mode signal having advantages that will become apparent from the discussion below. Preferably, source 52 outputs a differential voltage signal that is converted to a differential current signal by V-I converter 54. To maximize rejection of common mode signals, processing by V-I converter 54 is preferably performed near voltage source 52 at input stage 51, thereby facilitating rejection of common mode signals, such as noise, given the likelihood these signal are the same or nearly so.

Once converted and amplified, the current signal is transported by a transmission device 56, for example, a cable, flex circuit, wire, etc., to an output stage 57 comprising a signal conditioning block 58 (e.g., block generally referring to a circuit of any type and size capable of producing the output described) that preferably includes a current-to-voltage (I-V) converter. The differential current signal is processed by block 58 to return the signal to a voltage mode signal for further processing by the instrument using a current-to-voltage (I-V) converter (described below), with circuit 58 and converter 54 combining to amplify the signal to a level usable by, for example, a data acquisition and control circuit or system 107. Notably, the differential current signal is robust and thus not likely to be contaminated by transmission over cable 56. And, by transmitting the current mode signal to a remote location for further processing by the instrument, such further processing and the corresponding power dissipation associated therewith (discussed further below) is kept separate from the input stage 51 thereby minimizing the adverse effects of thermal drift caused by such dissipation.

Figure 4B:
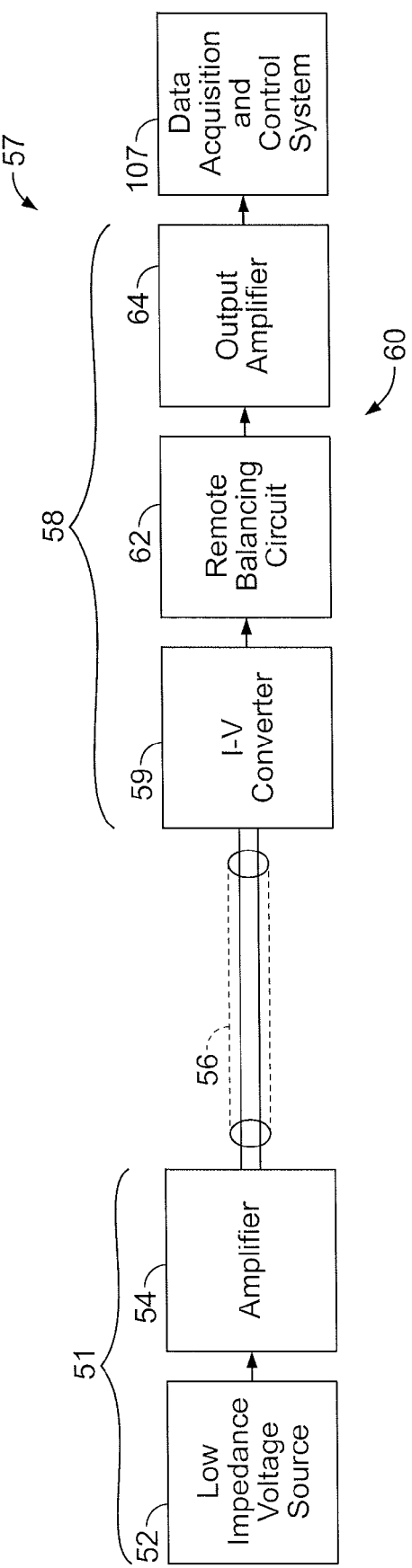
FIG. 4B is a block diagram similar to FIG. 4A, illustrating an alternate embodiment of the present invention.

Turning to FIG. 4B, an alternate amplifier 60 having an input stage 51 substantially identical to that shown in FIG. 4A but designed for an instrument employing a sensor generating a differential output, e.g., a strain gauge sensor having four branches arranged in a Wheatstone bridge, is shown having an alternate signal conditioning block 58 having an I-V converter 59 at output stage 57. In this case, a remote balancing circuit 62 is provided to balance the input stage so that, in the nominal case, the differential signal is zero, thus maximizing the range of usable signals that are generated by source 52, i.e., the strain gauge position sensor. More particularly, even in the nominal case (non-operation), due to differences in the construction and composition of, for example, the resistor strain gauges, the nominal voltage across the Wheatstone bridge is often something other than zero. As a result, it is preferred to compensate for the imbalance of the bridge so that the output is nominally substantially zero. As a result, the range of detectable voltage differentials is maximized. The details of implementing the remote balancing circuit 62 are described further below in connection with FIGS. 6-8. FIG. 4B also illustrates an output amplifier 64 of block 58 that conditions the amplified current signals converted to voltages from a differential output to a single ended output usable by the instrument, e.g., in an AFM feedback loop of data acquisition and control system 107, etc. Again, by locating I-V converter 58, remote balancing circuit 62 and output amplifier 64 remote from the sensor and voltage to current converter, power dissipation at the input stage 51 is minimized, while still maintaining high rejection of common mode signals by performing its amplifying function at the input stage 51.

Figure 5:
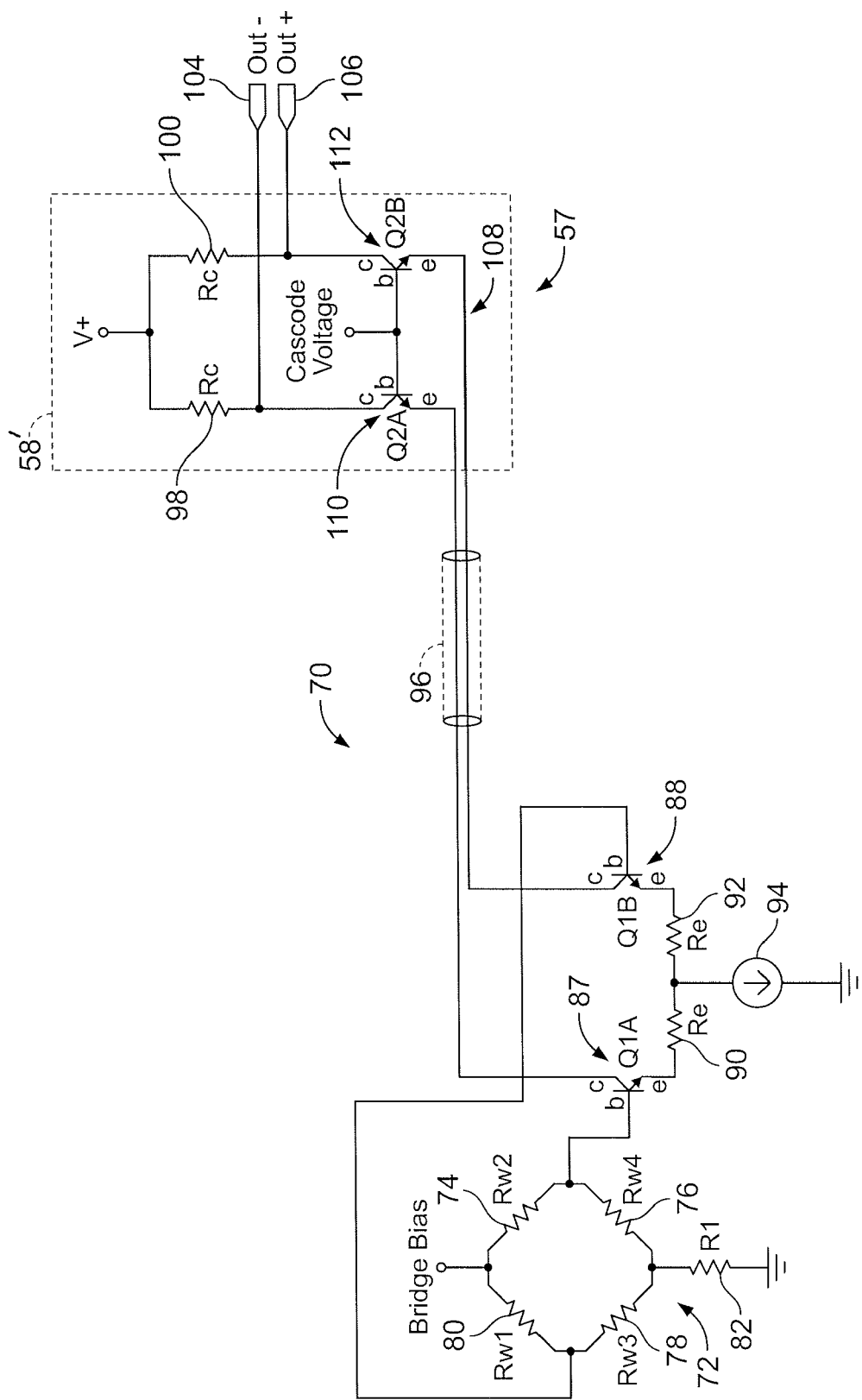
FIG. 5 is a schematic circuit diagram implementing a preferred embodiment of the amplifying apparatus of FIG. 4A.

Referring next to FIG. 5, a first preferred implementation of an amplifying apparatus 70 corresponding to the block diagram illustrations of FIG. 4A is shown. A strain gauge based sensor 72 operates as the low impedance voltage source in which four resistors 74, 76, 78, 80 are arranged in a Wheatstone bridge configuration to provide a differential output in response to strain experienced by the individual resistors. Notably, however, the low impedance voltage source could be the output generated by thermocouples, platinum RTD sensors, thermistors, geophones or the like.

In the case shown in FIG. 5, all four of resistors 74, 76, 78, 80 are preferably strain gauges with each pair 74, 78 and 76, 80 coupled to the object being measured (e.g., an SPM actuator such as a flexure) in compression and tension, respectively. By making each of the resistors strain gauge resistors, maximum signal can be obtained (i.e., larger measured voltage differences), which is particularly useful given the low voltage nature of the signals produced by sensor 72. Notably, a resistor 82 extending between the connection point of strain gauge resistors 76, 78 and ground is an optional resistor and may be included for temperature compensation. More particularly, the temperature coefficient of the gauge factors (how much resistance changes with temperature) of the bridge resistors 74-80 and the temperature coefficient of the nominal resistances of the bridge resistors 74-80 are opposite in sign so by selecting an appropriate value for the resistor 82 (e.g., empirically) the total temperature sensitivity can be improved.

Notably, the bias on the bridge is preferably about 2.5 volts. Moreover, the typical common electronic interference at the terminals is 60 Hz noise, though other sources of interference will typically be present.

Continuing, the differential signal is then transmitted to a voltage-to-current (V-I) converter 84 preferably including a differential transistor pair 86 (i.e., emitter-coupled pair) that converts the low voltage differential signal to an amplified differential current signal. More particularly, voltage-to-current converter 84 includes a pair of emitter coupled transistors 87, 88, preferably bipolar junction transistors (BJTs) matched to optimize performance. The matched emitter coupled pair of transistors or input BJT transistors 87, 88 have emitter terminals "e" coupled through degeneration resistors 90, 92.

In addition, though transistors 87, 88 are preferably matched, they need not be. That said, matched integrated transistors are ideal for this purpose because they have properties similar to one another given that they are fabricated from the same piece of silicon on the same day, the same die, etc., so that they typically have very similar properties and are thermally at the same temperature, notable because the base-emitter drop, which is preferably zero, is temperature sensitive and thus susceptible to thermal drift. Moreover, using matched or integrated transistors operates to minimize any DC offset that might be present due to variations in the base-emitter drop of the transistors, etc., which could compromise the acquired data.

Operation of the conversion/amplification of the voltage signal to a current mode signal is as follows. The emitter terminals "e" of each transistor 87, 88 follow the voltage at the corresponding base terminals "b" of transistors 87, 88, with a relatively constant voltage drop across the base-emitter junction due to the diode properties of the junction intrinsic to thereto. With essentially zero current flowing through the bases (due to the high current gain of the transistors), if the voltages at the two base terminals are equal, the current from the current source 94 will split substantially evenly between the two transistors 87, 88. If, on the other hand, one of the base terminals is at a slightly higher voltage than the other, the emitter voltages will differ by approximately the same amount.

In the preferred case, as the resistance of the strain gauges 74, 76, 78, 80 changes in response to strain forces experience by the object to which the resistors are coupled (e.g., an AFM actuator) a differential voltage appears between the emitter terminals of transistors 87, 88. Therefore, the voltages across the degeneration resistors 90, 92 will differ by the same voltage, and the current from source 94 will split unevenly to maintain the detected voltage difference. As a result, in the nominal condition, the currents at the collector terminals "c" of the two transistors 87, 88 are one half of the value of the current source 94 (selectable by the user), with the amplified signal appearing as a difference current between the two collector currents. Notably, the current gain insures that the base currents of the transistors are small and thus the sensor 72 will not be loaded or otherwise disturbed.

As suggested previously, though preferred, the degeneration resistors 90, 92 may be removed depending on the application. The emitters of transistors 87, 88 exhibit a small effective resistance because the base-emitter voltage drop varies slightly with emitter current. As a result, circuit 70 operates even if the degeneration or emitter resistors 90, 92 are 0 ohms. However, because the intrinsic emitter resistor value depends on a variety of factors including emitter current, operating temperature, and transistor fabrication conditions, degeneration resistors 90, 92 are typically included for applications requiring controlled gain and good linearity.

By selecting the value of the degeneration resistors 90, 92 and current source 94 the transimpedance gains can be set. In general, the goal is to provide adequate linearity over the range of potential sensor voltages while maintaining acceptable noise characteristics and power dissipation. Linearity is improved by increasing the value of the degeneration resistors 90, 92, but doing so also increases the noise because of the Johnson noise associated with the resistors 90, 92, as understood in the art. Increasing the current provided by current source 94 also improves the linearity because it decreases the variation in the intrinsic emitter resistances, but power dissipation is correspondingly increased, which is non-ideal due to the location of the voltage-to-current converter near sensor 72 which again is preferred to maintain high noise immunity. In the end, using preferred embodiments and appropriately selecting the value of degeneration resistors 90, 92 and the value of current source 94, power dissipation and noise of the voltage-to-current converter 84 can be maintained at a value less than the power dissipation and noise of the bridge 72 itself, which is particularly important as the amplification is performed in close proximity to the sensor 72 to insure maximum noise immunity. As compared to using an instrumentation amplifier, in fact, power dissipation can be reduced by a factor of 100.

The amplified differential current mode signals are then transmitted via a transmission device 96 such as a cable to a location remote from the AFM head for further processing of the signals for use by the AFM. As shown in FIG. 5, a signal conditioning block 58' converts the differential current signal to a voltage signal using output resistors 98, 100 powered by a bias, V+, typically set at about 15 volts. An amplified output differential voltage signal indicative of the strain detected by the resistors 74-80 of the Wheatstone bridge 72 is thus available via differential output lines at output terminals 104, 106 for use by the AFM data acquisition and control system (107 in FIGS. 4A and 4B), for example.

Circuit 58' also includes a cascode circuit 108 including an emitter coupled pair of output transistors 110, 112, preferably matched NPN BJT transistors, that are powered by a voltage. Emitter pair 110, 112 maintains a constant voltage at the collectors of the input stage transistors 87, 88 because the base terminals of cascode transistors 110, 112 are at a constant voltage labeled "cascode voltage," and the base-emitter voltage drop is relatively constant. Also, the current gain of transistors 87, 88 insures that the base current is small, so that the signal current transmitted is substantially unchanged through cascode transistors 110, 112 (emitter coupled pair of balanced transistors). Generally, input stage transistors 87, 88 have as little voltage across them as possible to minimize power dissipation of input stage 51. Notably, it is the voltage at the emitters of the cascode transistors 110, 112 times the current of the collectors of the input stage transistors 87, 88 that yields power dissipation. By being able to control the emitter voltage of transistors 110 and 112 and thus the collector voltage of input stage transistors 87, 88, the power dissipation of the input stage can be controlled. Since the output of the first stage is provided in current mode, it does not require a large voltage to accommodate an output voltage swing. This is in direct contrast to the use of a conventional instrumentation amplifier to amplify strain gauge sensor signals given that the IA typically is operated off plus and minus 15 volts to accommodate the span of the amplified output.

In one preferred embodiment, the cascode voltage is set at about 2.5 volts, and further reductions are possible. The current is also much less because only two transistors are needed, whereas the instrumentation amplifier employs a differential pair of transistors at each input of the amplifier, with several other electronic components drawing current. As a result, the current provided by current source 94 is much less than that required to operate an instrumentation amplifier, again offering considerable reduction in power dissipation.

Also, by maintaining a constant voltage at the collectors of the input stage transistors, linearity is improved because the Early effect (current gain increase with increased voltage causing an increase in current even with the transistor in saturation) is substantially eliminated. In other words, by maintaining the collectors at a constant voltage, the base-emitter drop of the input stage transistors 87, 88, which depends slightly on collector voltage, does not substantially change.

As highlighted previously, it is preferred that cascode circuit 108 be situated at a remote location in order to minimize power dissipation in the range of sensor 72. Notably, the acquired signals are not compromised by the remote signal conditioning components due to the fact that the amplified current mode signals are in a form particularly suited for transmission over cable 96. Namely, by converting the acquired signals (e.g., position signals) from voltage mode to current mode, the signals are inherently more resistant to coupling of external interference, as understood in the art.

Notably, the differential current of the input stage transistors 87, 88 is given by the relationship, $$I_{dif} \alpha V_{dif}/2R_E \qquad \text{Equation 1}$$

Figure 1:
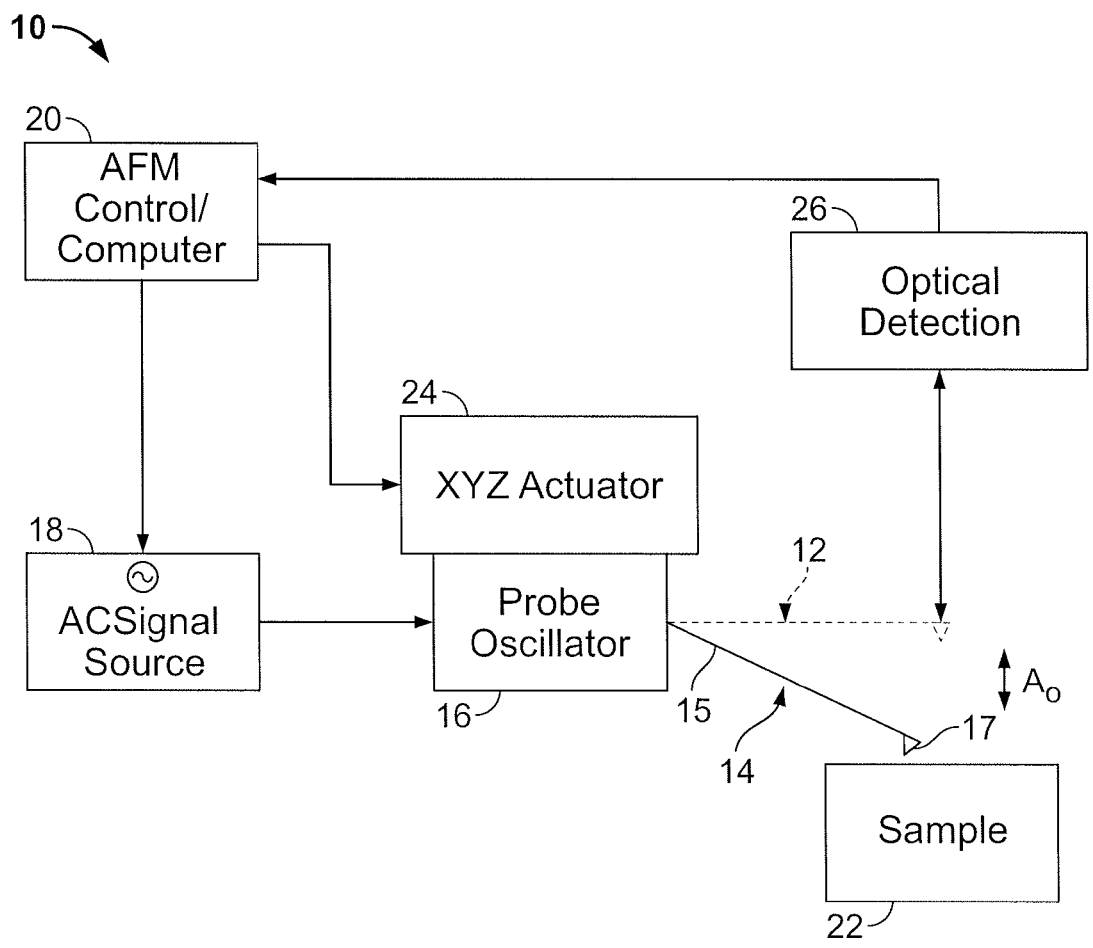
FIG. 1 is a schematic diagram of an atomic force microscope (AFM), appropriately labeled "prior art"
Figure 2:
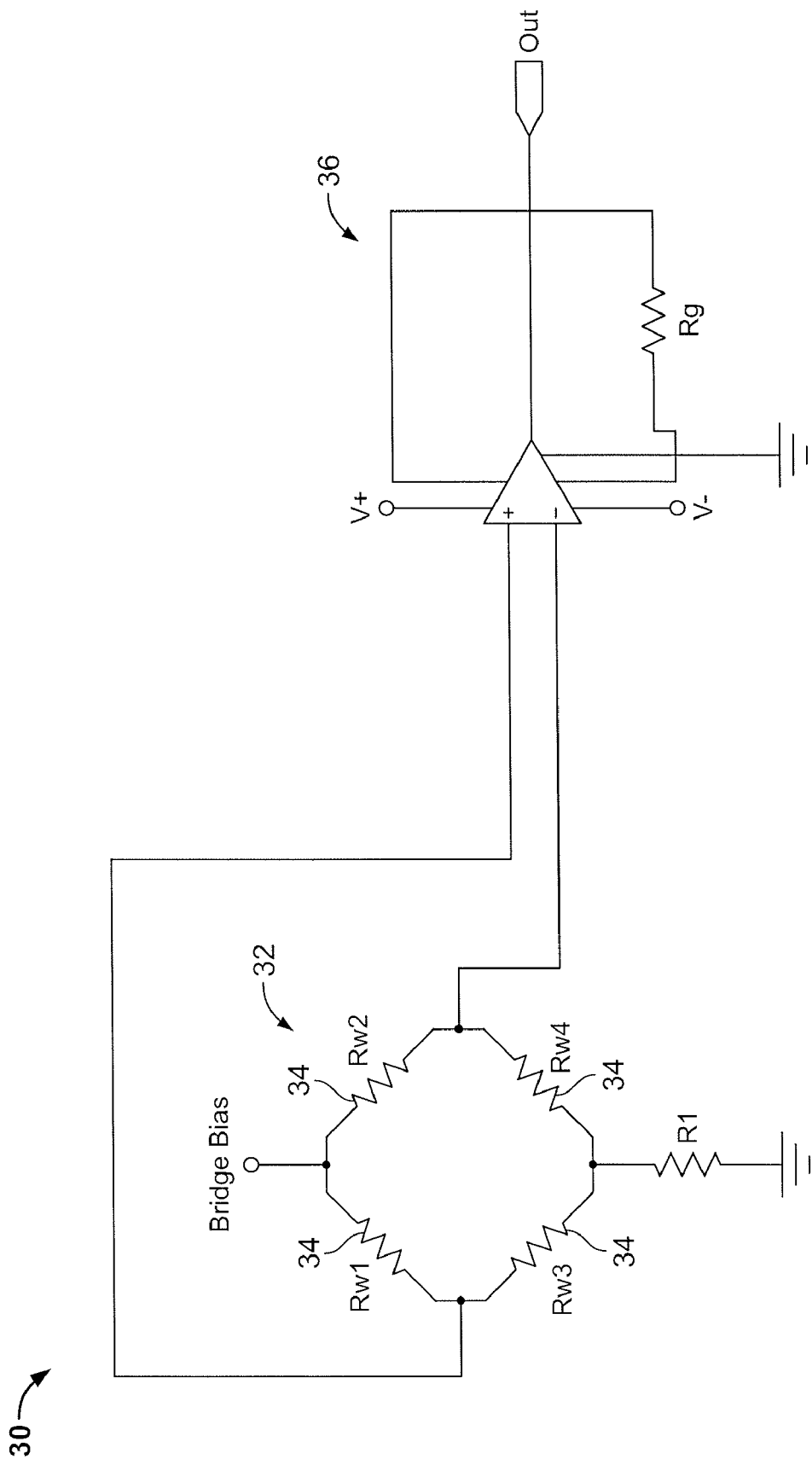
FIG. 2 is a schematic circuit diagram of a topology for amplifying low voltage signals, appropriately labeled "prior art"
Figures 3A, 3B, 3C:
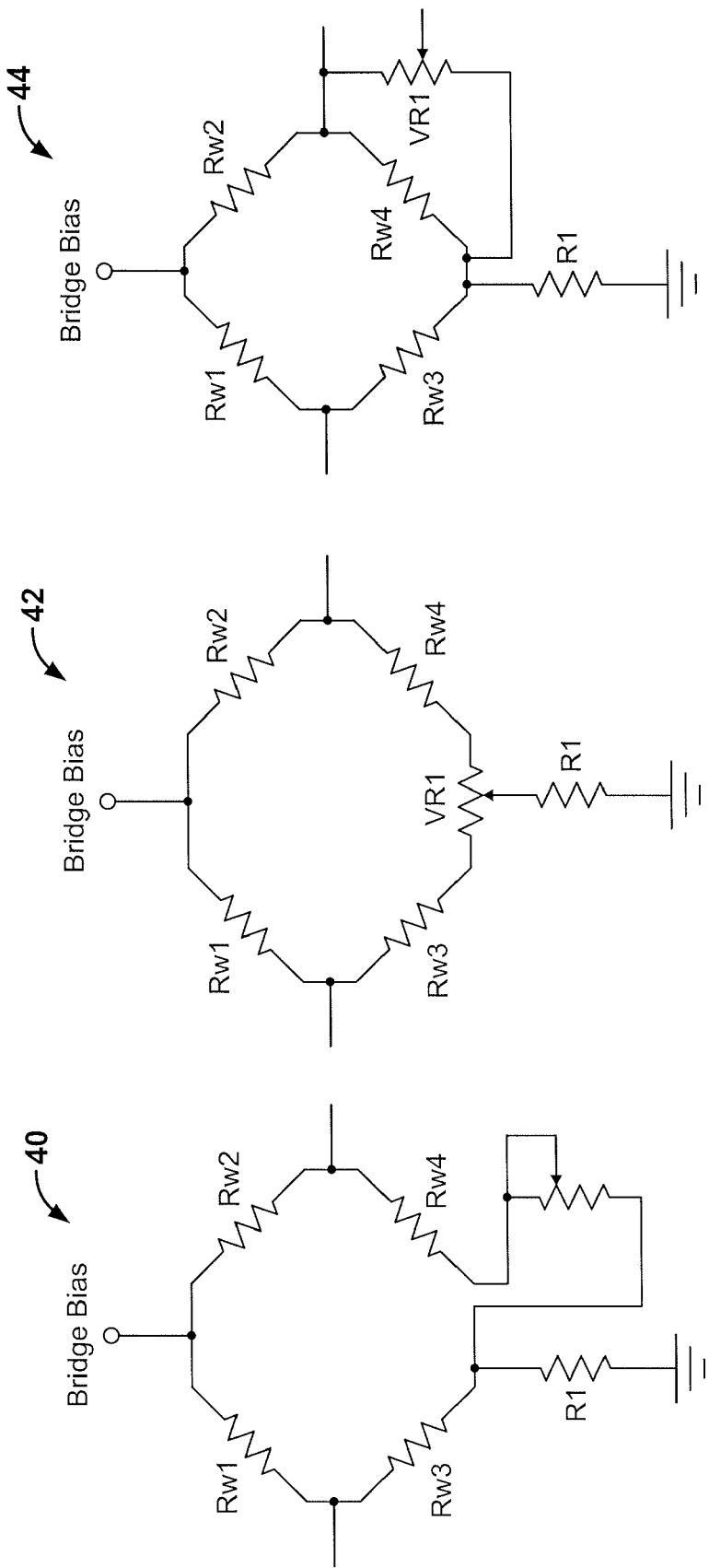
FIGS. 3A-3C are schematic circuit diagrams of prior art topologies for balancing a Wheatstone bridge circuit used to detect low voltage signals, appropriately labeled "prior art"
Figure 6:
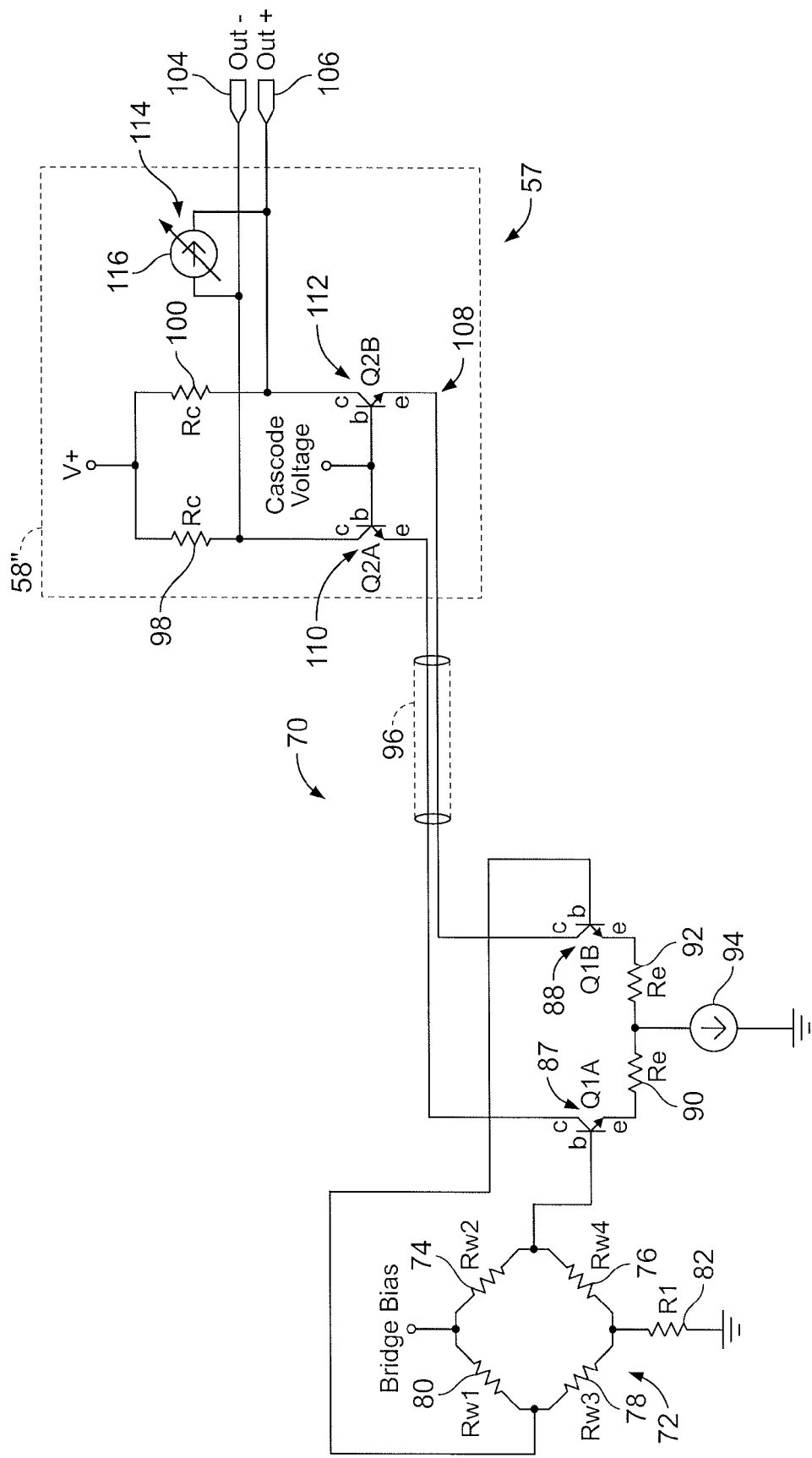
FIG. 6 is a schematic circuit diagram similar to FIG. 5, further including a remote balancing circuit.

Next, in FIG. 6, a schematic representation of a remote balance circuit 114 of a signal conditioning block 58" is provided. Circuit 114 remotely compensates for imbalances in the bridge resistors 74, 76, 78, 80 of strain sensor 72 of the circuit shown in FIG. 5. More particularly, circuit 114 includes a current source 116 that is preferably a variable, bi-directional current source. In general, source 116 is controllable to subtract current from one of the terminals and add it to the other, thus appearing to the input stage amplifier (V-I converter 86) to be additional current. The current passes through the collectors "c" to the emitters "e" of transistors 87, 88, causing a voltage drop across resistors Re 90, 92 which, as a result, compensates for the difference in voltage across the output terminals of the Wheatstone bridge strain sensor 72. By balancing the bridge in this way, the dynamic range of the amplifier is optimized by centering sensor 72. Advantageously, this is done remotely without any additional wires or circuitry thereby minimizing power dissipation and susceptibility to noise. (See FIGS. 3A-3C and discussion above)

Setting the value of the variable current source to balance the bridge can be performed in any of several ways including automatically with a feedback loop, using an appropriate algorithm, or manually by the instrument operator. Using a feedback loop, for example, the voltage applied to the current source to control the output of the current source (direction/ magnitude) is continually monitored and adjusted to maintain a zero differential output across resistors 98, 100. The voltage going to current source 116 is proportional to the direction and magnitude of the current source and therefore is proportional to the difference voltage generated by the Wheatstone bridge.

Figure 7:
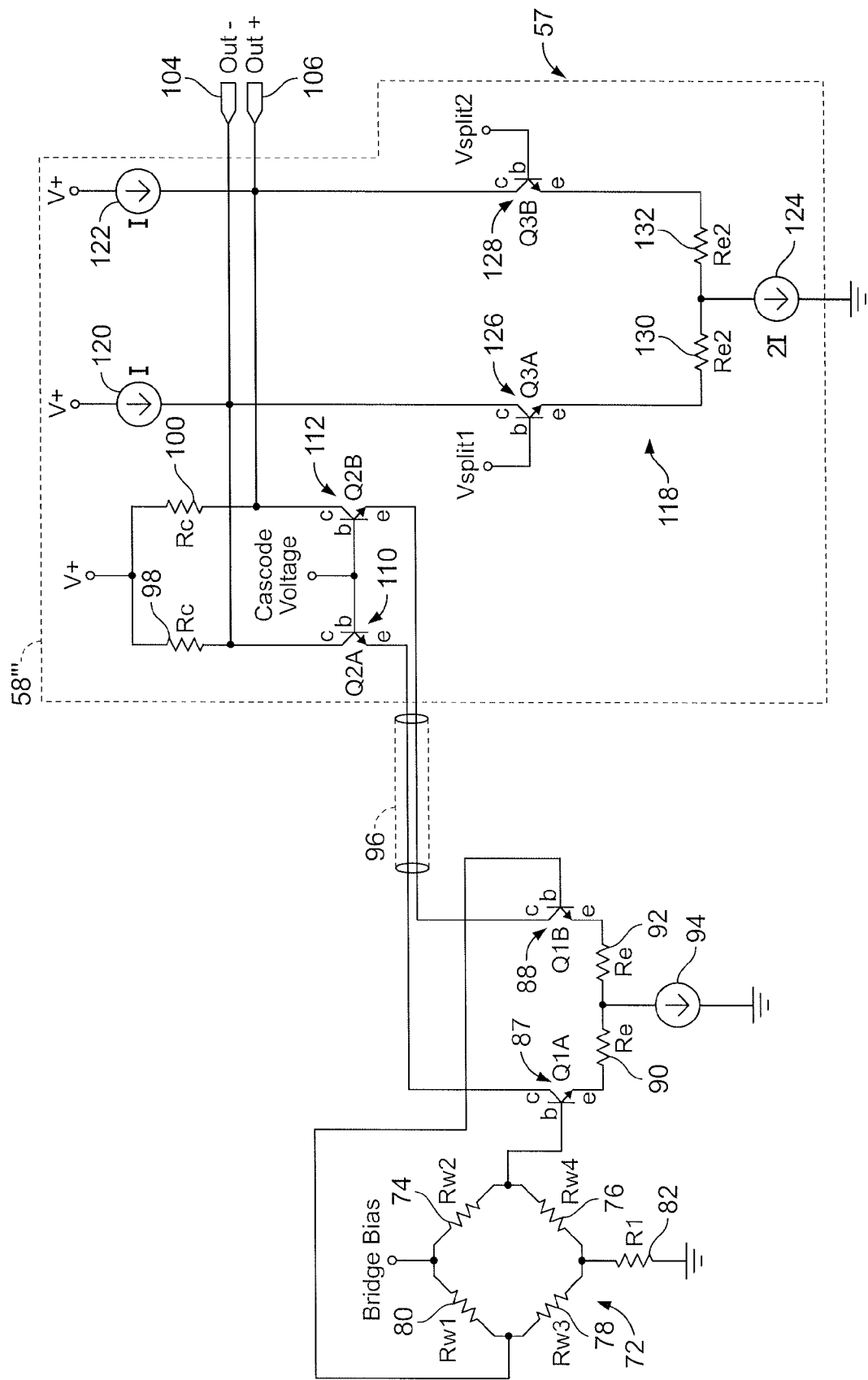
FIG. 7 is a schematic circuit diagram similar to FIG. 6, illustrating a preferred embodiment of the remote balancing circuit.

Turning to FIG. 7, a practical implementation of a remote balance circuit 118 of a signal conditioning block 58''' employing these characteristics is shown. Circuit 118 includes three current sources 120, 122, 124 that are substantially matched. Notably, assuming top first and second current sources 120, 122 each generate a current "I", bottom current source 124 generates a current "2I." Similar to the input stage amplifier 86 and the cascode circuit 108 described previously, this preferred implementation employs an emitter coupled pair 118 including transistors 126, 128. Optionally, but preferably, degeneration resistors 130, 132 are also provided. In operation, to balance the bridge, current from source 124 travels through the two transistors 126, 128, and is essentially absorbed, evenly, by top current sources 120, 122. Again, in the nominal condition, there should be zero voltage output by the bridge. To achieve this result, a selectable differential voltage (Vsplit1 and Vsplit2) is applied to the bases "b" of transistors 126, 128, thus drawing an unbalanced current from source 124. The unbalanced current is transmitted to the input stage thus causing a voltage drop across input stage resistors 90, 92. To compensate for bridge imbalance, the differential voltage (Vsplit1 and Vsplit2) is adjusted to produce zero differential current output by the first stage amplifier.

Figure 8:
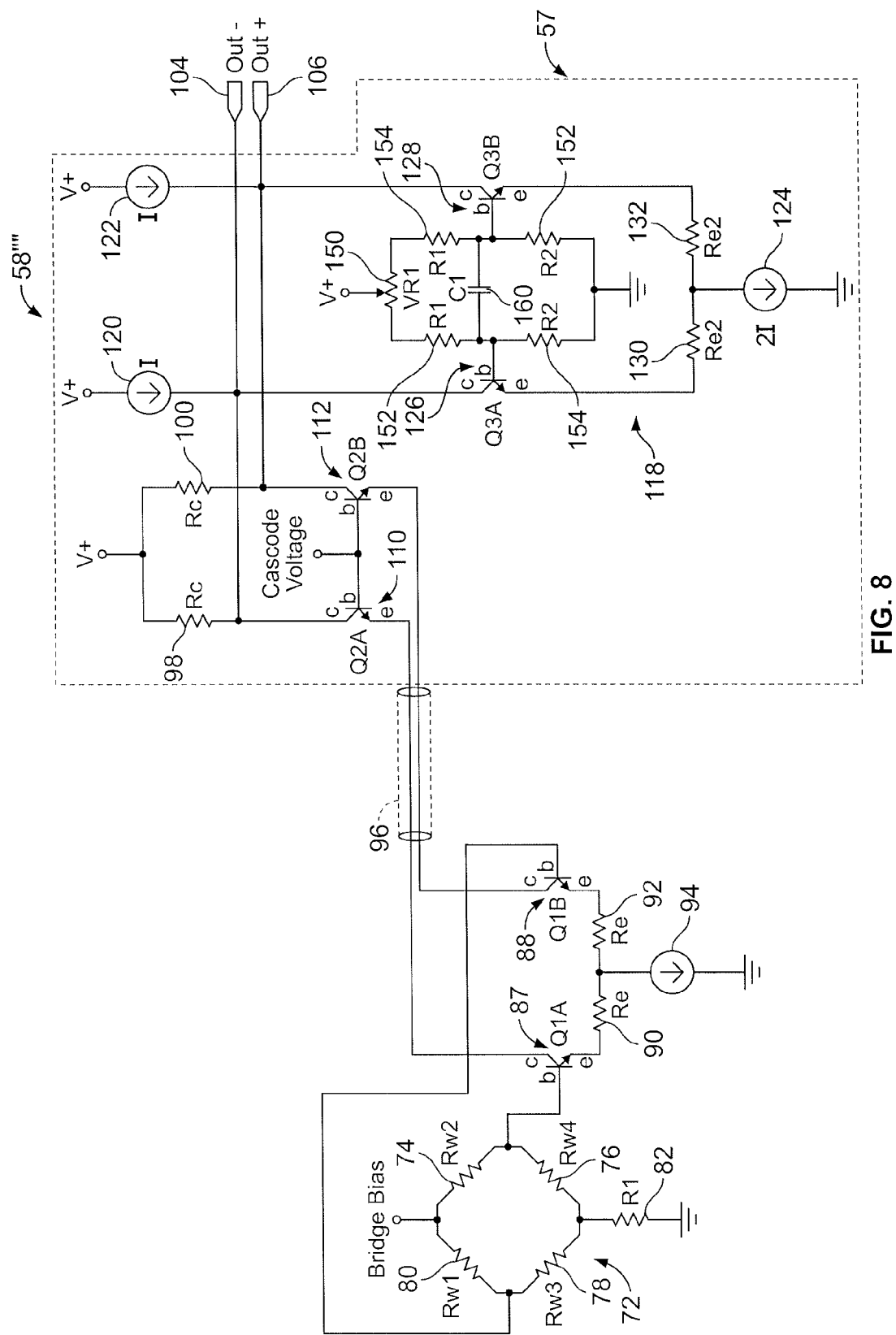
FIG. 8 is a schematic circuit diagram similar to FIG. 7, illustrating another preferred embodiment of the remote balancing circuit.

Next, in FIG. 8, an alternate configuration of the remote balance circuit is shown. Similar to the embodiment of FIG. 7, a balancing circuit 134 of signal conditioning block 58"" includes three current sources 136, 138, 140 and a matched emitter coupled pair of balancing transistors 142, 144 (with optional degeneration resistors 146, 148) that operate essentially as described above. In this case, however, a potentiometer 150 is provided to control the differential voltage at the bases of transistors 142, 144 so that the current produced by sources 136, 138, 140 is split according to the setting of the potentiometer 150. An uneven split appears as a differential current which is transmitted back to the input stage amplifier 86, through the cascode circuit 108. This differential current is converted to a differential voltage by the input stage degeneration resistors 90, 92, thereby compensating for any bridge imbalance. Capacitor (C1) 160 operates as a filter to minimize adverse external interference, such as noise, that would otherwise corrupt the data signals. Notably, resistors 152, 154, 156, 158 are provided to drop the voltage and control the swing, ultimately preferably producing a differential voltage of about +/−100 millivolts between the bases of transistors 142, 144, though this differential voltage will depend on the value of degeneration resistors 146, 148.

Figure 9:
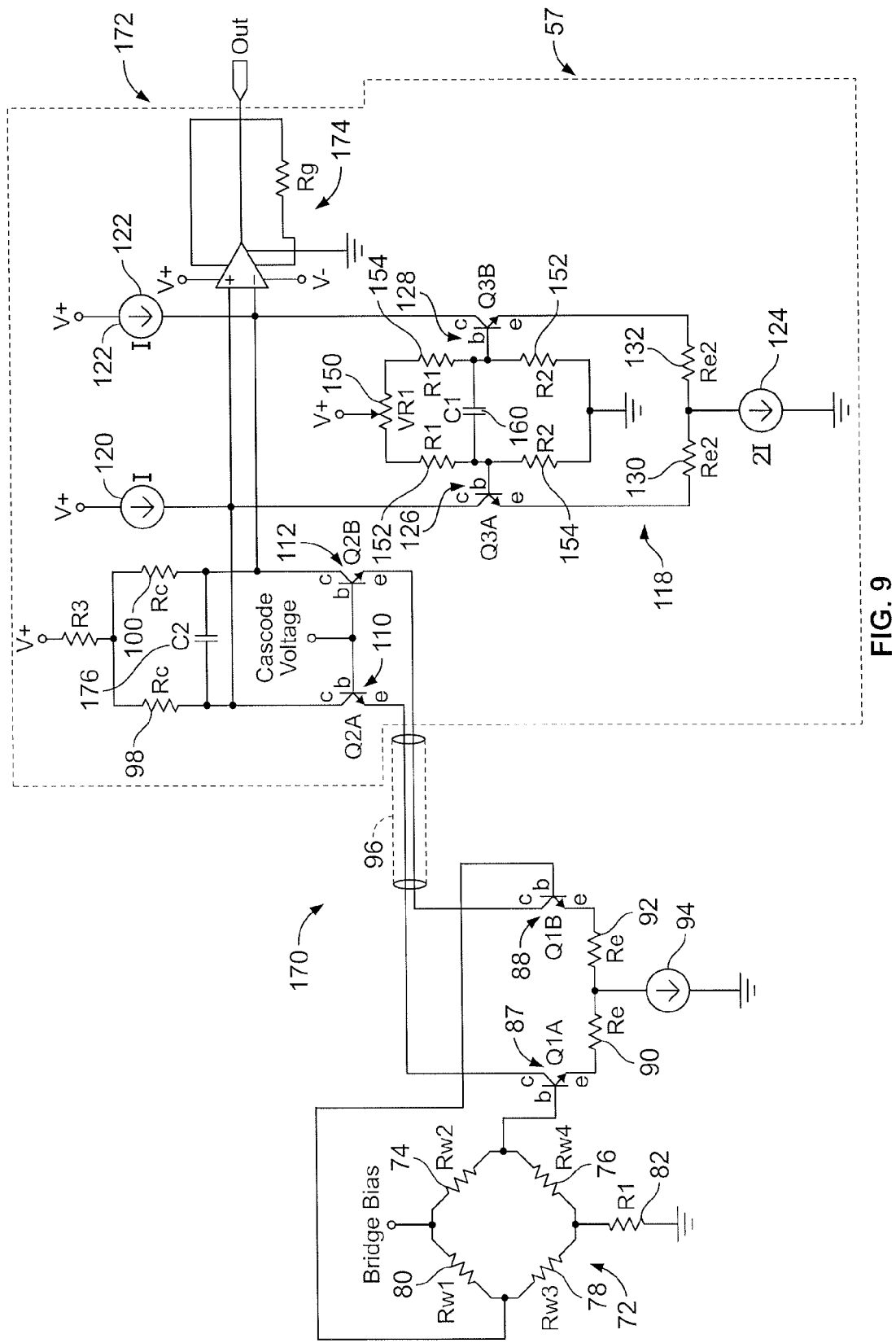
FIG. 9 is a schematic circuit diagram similar to FIG. 8, illustrating an alternate embodiment further including an output amplifier to convert the differential signal to a single ended output referred to ground.

Turning to FIG. 9, a sensing and amplification apparatus 170 according to a preferred embodiment is illustrated. Amplifier 170 of FIG. 9, and more particularly the output signal conditioning block 172, includes circuitry to optimize performance and usability of the base circuit shown in FIG. 8. Namely, an instrumentation amplifier 174 is employed at output stage 57 (FIG. 4A) as part of signal conditioning block 172 to further amplify the output signals, now voltage mode. Moreover, instrumentation amplifier 174 operates to convert the differential output to a single-ended output, i.e., a non-differential output voltage signal. In this way, the output is referenced to ground so that it may be more easily measured. Notably, the operational amplifier is provided by +/−15 volts, typically, as are the current sources of the remote balancing circuit. By no coincidence, these high power circuit components are disposed at output stage 72 of amplifier 170 to minimize the adverse thermal effects of high power dissipation at input stage 51, for example, housed in the head of an AFM. Alternatively, this function could be performed using an current input A/D converter.

The signal conditioning block 172 preferably also includes a capacitor C2 176 to filter the output/limit bandwidth. Also, resistor R3 is an optional resistor provided to limit the swing of the voltages at the input of the instrumentation amplifier 174.

Figure 10:
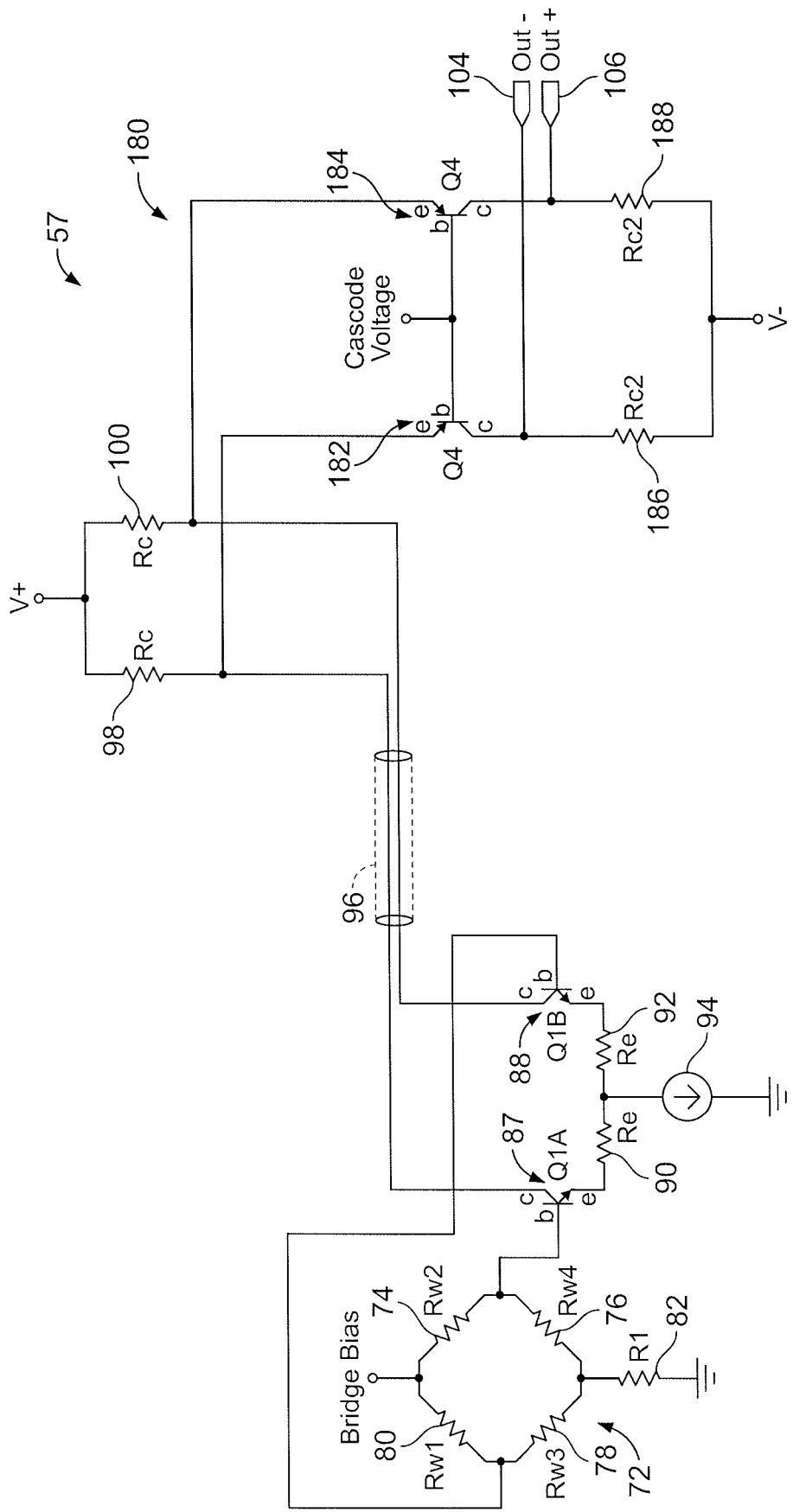
FIG. 10 is a circuit diagram similar to FIG. 5, illustrating an alternate embodiment of the cascode circuit.

Turning to FIG. 10, an alternate arrangement of the cascode circuit (108 in FIG. 5) is illustrated. In this case, the NPN BJT transistors have been replaced by PNP transistors 182, 184, with output resistors 186, 188, in an arrangement known as a "folded cascode" circuit 180. This arrangement is preferred for some applications because it allows for more "swing" of the differential signals (i.e., larger dynamic range), as well as allowing the voltages to be set nearer to ground, if desired.

Figure 11A:
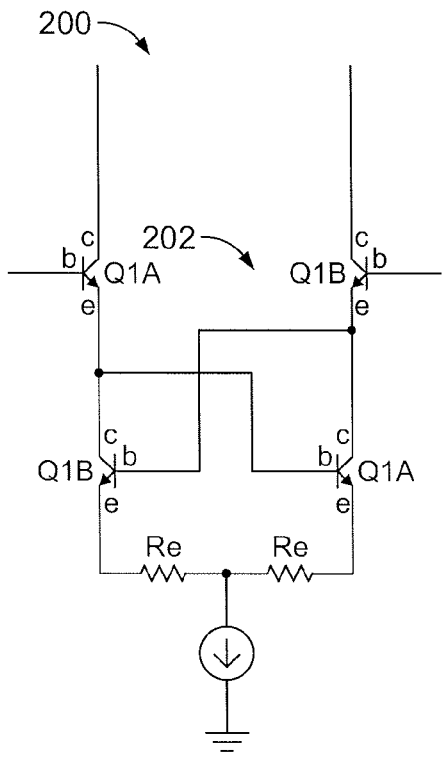
FIGS. 11A-11D are circuit diagrams illustrating alternate embodiments of the differential transistor pairs of the preferred embodiments.
Figure 11B:
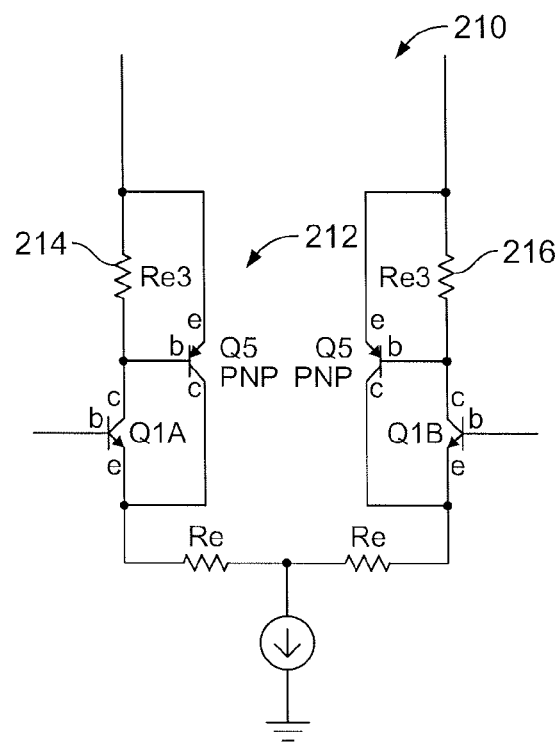
Figure 11C:
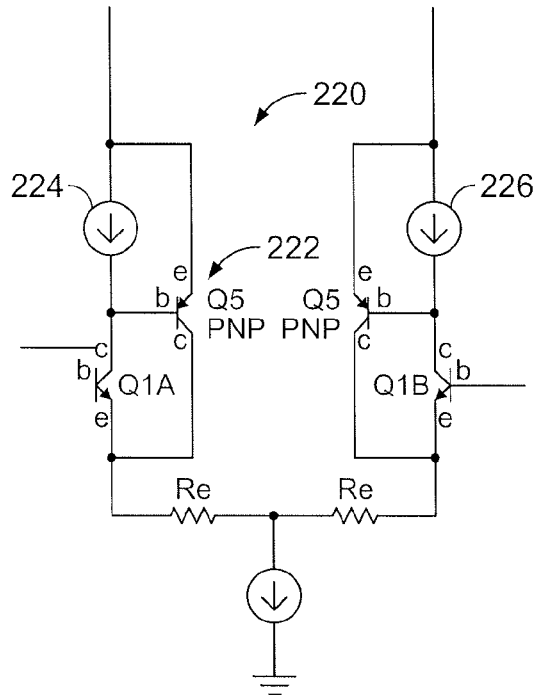
Figure 11D:
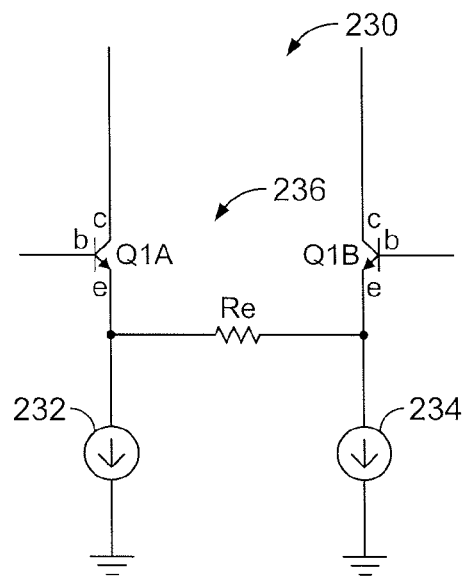

To improve linearity of the differential pairs of transistors used in the different components of the preferred embodiments of the amplifier, namely, input stage voltage to current converter, the cascode circuit, and the remote balance circuit, alternate arrangements may be used. First, referring to FIG. 11A, a circuit 200 including a second emitter pair 202 defining PNP transistors to make the input stage base-emitter drop voltage be more constant is provided. Making a similar change in the remote balance circuit, improvement to the linearity can also be seen. In FIG. 11B, a circuit 210 including a combination of NPN and PNP matched pairs 212 can be included to further improve linearity of the differential pairs of transistors. The PNP transistor operates to shunt all of the current except for a small constant amount away from the input transistors on the input stage. Because the input transistors operate at constant current, linearity can be significantly improved. Similarly, as shown in FIG. 11C, linearity can be improved by replacing resistors 214, 216 of a PNP transistor pair 222 with current sources 224, 226. In yet another alternate arrangement, as shown in FIG. 11D, a pair of current sources 232, 234 are used so that a single emitter resistor may be used. This topology might be used if a switchable first stage gain is required.

In sum, power dissipation with each embodiment is substantially lower than systems that employ a high power dissipating amplifier, such as instrumentation amplifier, to amplify the strain gauge output signals. This is due to the fact that the total supply voltage required to power the amplifier of the preferred embodiments is significantly less than such known systems (e.g., about 2.5 volts). More particularly, because the amplified output signals generated are current mode signals with relatively constant voltage, it is not necessary to provide a power supply with sufficient voltage to accommodate the full range of the output voltages of a voltage mode output signal. As a result, the amplifier of the preferred embodiments can be powered by about 2 to 2.5 volts. Also, compared to instrumentation amplifiers which have many stages, the total current draw is significantly less. In the end, the present preferred embodiments are able to amplify signals from low impedance sources such Wheatstone bridge configured strain gauges with a 100× reduction in power dissipation without compromising other key metrics such as CMRR. For example, the preferred embodiments of the amplifier can maintain power dissipation at less than about 100 mW for an input referred noise (noise at the output divided by the gain, i.e., how much noise is added to the input by amplifying the signal) equal to less than about 6 nV/root Hz, and ideally, less than about 20 mW for an input referred noise of less than about 3 nV/root Hz, and more ideally, less than about 2.5 mW for noise less than about 3 nV/root Hz.

Although the best mode contemplated by the inventors of carrying out the present invention is disclosed above, practice of the present invention is not limited thereto. For example, bipolar transistors can be replaced by field effect transistors (FETs). Typically performance may not be as optimum as with the BJTs but the operation and concept remain generally the same. Moreover, there are many possibly iterations of embodiments for the current source used in the remote balance circuit. The illustrated example is preferred. Moreover, though the polarities of the components of the circuits have been indicated as shown, the polarities may be reversed. This is accomplished primarily by replacing the PNP transistors with NPN transistors and vice versa, and reversing the polarity of the voltage and current sources. As understood in the art, the polarity change may be desirable depending on the specifics of the application yet the alternate components operate in essentially the same way. It will be manifest that various additions, modifications and rearrangements of the features of the present invention may be made without deviating from the spirit and scope of the underlying inventive concept.

What is claimed is:

1. A probe microscope that analyzes a sample, the microscope comprising:
    a probe device;
    an actuator;
    a transducer that generates a voltage signal indicative of a property of at least one of the probe device, the sample, and the actuator;
    a voltage to current (V-I) converter that receives the voltage signal from the transducer and generates a current signal;
    a signal conditioning block and a transmission device that transmits the current signal to the signal conditioning block; and
    wherein the signal conditioning block includes a current to voltage (I-V) converter to convert the current signal to an output voltage signal.

2. The probe microscope of claim 1, wherein the transducer is a position sensor.

3. The probe microscope of claim 2, wherein the position sensor is one of a group including a strain gauge, an LVDT sensor, an RTD sensor, a piezoelectric transducer, a photodiode, a photo resistor, a four-point probe, and a spreading resistance sensor.

4. The probe microscope of claim 3, wherein the position sensor monitors movement of the actuator.

5. The probe microscope of claim 4, wherein the actuator is a SPM actuator comprised of at least one of a group including a piezoelectric actuator, a flexure, and a mechanical translation stage, the actuator providing at least one of a) relative motion between the probe device and the sample, and b) X-Y scanning motion.

6. The probe microscope of claim 2, wherein the position sensor includes at least one strain gauge sensor arranged in at least a portion of a Wheatstone bridge.

7. The probe microscope of claim 6, wherein the signal conditioning block includes a remote balance circuit to compensate for an imbalance in the Wheatstone bridge.

8. The probe microscope of claim 7, wherein the current signal is a differential current signal and the output voltage signal is a differential output voltage signal, and the remote balance circuit includes at least one current source coupled between differential output lines corresponding to the differential output voltage signal.

9. The probe microscope of claim 8, wherein the remote balance circuit includes an emitter coupled pair of balancing transistors.

10. The probe microscope of claim 9, wherein the emitter coupled pair of balancing transistors have collector terminals connected to corresponding first and second current sources having an output I, and emitter terminals connected to a third current source having an output 2I.

11. The probe microscope of claim 10, further comprising corresponding degeneration resistors connected between corresponding emitter terminals and the third current source.

12. The probe microscope of claim 1, wherein the current to voltage converter includes an output resistor that receives the current signal to produce the output voltage signal.

13. The probe microscope of claim 12, further comprising an output amplifier to convert the output voltage signal to a single ended output voltage signal.

14. The probe microscope of claim 13, wherein the output amplifier is an instrumentation amplifier, and the single ended output voltage signal is referenced to ground.

15. The probe microscope of claim 12, wherein the signal conditioning block further includes a filter coupled to the output resistor.

16. The probe microscope of claim 1, wherein the signal conditioning block conditions the current signal for use by a data acquisition and control system of the probe microscope.

17. The probe microscope of claim 16, wherein the signal conditioning block includes a current input A/D converter that conditions the current signal for use by the data acquisition and control system.

18. The probe microscope of claim 1, wherein the voltage to current converter includes an input emitter coupled to a pair of transistors that amplify the voltage signal.

19. The probe microscope of claim 18, wherein the input transistors are matched.

20. The probe microscope of claim 19, wherein the input transistors are input BJT transistors.

21. The probe microscope of claim 20, wherein the signal conditioning block includes a cascode circuit to maintain a substantially constant voltage at the collector terminals of the input BJT transistors.

22. The probe microscope of claim 21, wherein the cascode circuit includes an output emitter coupled to a pair of output BJT transistors having emitter terminals coupled to corresponding ones of the collector terminals of the input BJT transistors of the voltage to current converter.

23. The probe microscope of claim 16, wherein the voltage signal is a differential voltage signal and the V-I converter generates a differential current signal.

24. A probe microscope for analyzing a sample, the microscope comprising:
   a probe device;
   an actuator that provides relative motion between the probe device and the sample;
   a strain sensor coupled to the actuator, wherein the strain sensor includes at least one strain gauge resistor that generates a voltage signal;
   an amplifier to amplify the voltage signal to a current mode signal; and
   wherein power dissipation of the amplifier is less than about 100 mW for an input referred noise of about less than 6 nV/root Hz.

25. The probe microscope of claim 24, wherein power dissipation of the amplifier is less than about 20 mW for an input referred noise of about less than 6 nV/root Hz.

26. The probe microscope of claim 25, wherein power dissipation of the amplifier is less than about 25 mW for an input referred noise of about less than 3 nV/root Hz.

27. A method of amplifying low voltage signals generated by a position sensor coupled to an actuator of a scanning probe microscope, the method comprising:
   sensing movement of the actuator and generating a corresponding voltage signal;
   converting the voltage signal to a differential current signal in an input stage;
   transmitting the current signal from the input stage to an output stage; and
   converting the differential current signal in the output stage to an output voltage signal.

28. The method of claim 27, wherein a supply voltage required to perform the method is less than about 10 volts.

29. The method of claim 28, wherein the supply voltage is less than about 2.5 volts.

30. The method of claim 27, wherein power dissipation of the method is less than about 20 mW for an input referred noise of less than about 6 nV/root Hz.

31. The method of claim 30, wherein the power dissipation of the method is less than about 2.5 mW for an input referred noise of less than about 3 nV/root Hz.

* * * * *